(12) United States Patent
Betz et al.

(10) Patent No.: US 6,640,774 B2
(45) Date of Patent: Nov. 4, 2003

(54) METHOD FOR OPERATING A DIESEL ENGINE

(75) Inventors: Thomas Betz, Stuttgart (DE); Rüdiger Pfaff, Stuttgart (DE); Marco Stotz, Leinfelden-Echterdingen (DE); Ulrich Wiebicke, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 157 days.

(21) Appl. No.: 09/932,062

(22) Filed: Aug. 17, 2001

(65) Prior Publication Data

US 2002/0026922 A1 Mar. 7, 2002

(30) Foreign Application Priority Data

Aug. 17, 2000 (DE) .......................... 100 40 117

(51) Int. Cl.⁷ .................................. F02B 3/00
(52) U.S. Cl. .................. 123/299; 123/294; 123/568.11
(58) Field of Search ................ 123/294, 296, 123/299, 300, 46 R, 304, 193.3, 568.11, 568.13, 568.15, 568.17

(56) References Cited

U.S. PATENT DOCUMENTS

| | | | | |
|---|---|---|---|---|
| 3,892,207 A | * | 7/1975 | Weise et al. ................ 123/305 |
| 4,284,043 A | * | 8/1981 | Happel ........................ 123/299 |
| 4,311,127 A | * | 1/1982 | Mayer ......................... 123/557 |
| 5,195,487 A | * | 3/1993 | Zurner et al. ............... 123/300 |
| 5,345,897 A | * | 9/1994 | Linder et al. ............. 123/65 A |
| 6,050,248 A | * | 4/2000 | Arulraja et al. ........ 123/568.11 |

FOREIGN PATENT DOCUMENTS

| | | |
|---|---|---|
| DE | 37 23 599 | 1/1989 |
| DE | 39 36 619 | 5/1991 |
| DE | 197 47 231 | 4/1999 |
| EP | 0 886 050 | 12/1998 |

\* cited by examiner

*Primary Examiner*—Hieu T. Vo
*Assistant Examiner*—Johnny H. Hoang
(74) *Attorney, Agent, or Firm*—Kenyon & Kenyon

(57) ABSTRACT

In a method for operating a diesel engine having a cylinder, a piston which is guided in a longitudinally displaceable manner oscillating between an upper dead center position and a lower dead center position in the cylinder, and an injector having an injector valve for the injection of a fuel quantity into the cylinder, in a compression cycle delimited by the movement of the piston from the lower dead center position to the upper dead center position, combustion air is compressed. In a working cycle delimited by the movement of the piston from the upper dead center position to the lower dead center position, the injection of the fuel quantity occurs. In all operating states the injection begins after the upper dead center position, the injector valve being abruptly opened.

10 Claims, 2 Drawing Sheets

METHOD FOR OPERATING A DIESEL ENGINE

FIELD OF THE INVENTION

The present invention relates to a method for operating a diesel engine.

BACKGROUND INFORMATION

Ever more stringent exhaust-emission regulations place increased demands on the operation of diesel engines, the intention being that appropriate measures for reducing the pollutant emission, in particular of soot, CO and $NO_x$, should not lead to a reduction in the corresponding engine power and to an increase in the specific fuel consumption.

In conventional methods for operating diesel engines, the injection of fuel into a cylinder is divided into a pre-injection and a main injection. The pre-injection of a partial quantity of fuel in a period before the ignition upper dead center position can result in an improved homogenization of the fuel/air mixture. During the subsequent main injection, the ignition of the fuel/air mixture occurs in the region of the upper dead center position where at least a partial quantity of the mixture contributes to a reduction in the pollutant emission because of the improved homogenization. The main injection following the pre-injection may be drawn into the working cycle, in which case the pressure dropping in the cylinder during the working cycle may cause a reduction in the efficiency and along with that an increase in the fuel consumption.

It is an object of the present invention to provide a method for operating a diesel engine with reduced pollutant emission.

SUMMARY

The above and other beneficial objects of the present invention are achieved by providing a method for operating a diesel engine as described herein.

For this purpose, the injection is performed in all operating states at a sufficiently late point that it begins after the ignition upper dead center position, the injector valve being opened particularly rapidly, i.e., abruptly. By the particularly rapid release of the cross section and the associated "sharp" injection profile, a particularly good homogenization of the fuel/air mixture is obtained, and along with that a reduction in the formation of soot. This effect is assisted by a corresponding, high closing gradient of the injector valve, i.e., by an abrupt closing thereof. This "sharp" injection profile may be further emphasized by an enlarged opening of the injector valve and, in particular, by an increased injection pressure, as a result of which a further improvement in the homogenization of the fuel/air mixture may be obtained. In conjunction with the late beginning of the injection in the working cycle after the upper dead center position, the distribution of fuel in the combustion chamber is assisted by a prolonged ignition delay, which is assisted by the decreasing cylinder pressure in the expansion phase. The homogenized mixture burns at an extremely high speed, with little soot being formed. Furthermore, a reduction in the nitrogen oxide emission and in the development of noise may be obtained thereby. The injection may be performed as a main injection which is preceded by pre-injection in the compression cycle. The opening of the injector valve, and also the closing thereof, occurs in the main injection abruptly and with a higher gradient than in the pre-injection. Through the abrupt opening and closing of the injector valve in the main injection, the foregoing advantages are obtained, while the ignition performance of the fuel/air mixture is additionally improved by the pre-injection.

The homogenization of the fuel/air mixture may be assisted by division of the main injection into a plurality of sub-injections. In conjunction with an exhaust-gas recirculation system, the nitrogen oxide emission which has in any case already been reduced may be further reduced. Even with increasing exhaust-gas recirculation, the described homogenization of the cylinder charge does not lead to a rise in the formation of soot.

An afterinjection may be performed following the main injection, which results in an increase in the combustion-chamber temperature and the HC content in the exhaust gas. In conjunction with an exhaust-gas recirculation system, the postoxidation of soot within the engine may thereby be improved.

A homogenizing injection which begins during the induction cycle may be performed prior to the pre-injection. The appropriate fuel quantity is injected at a low cylinder pressure, which promotes homogenization of the fuel/air mixture. In conjunction with the pre-injection, an improvement in the ignition conditions in the main combustion further results therefrom.

As a consequence of the improved homogenization of the fuel/air mixture, the method according to the present invention may provide a reduction in the pollutant emission without a loss in efficiency even if the main injection occurs at a late point.

DETAILED DESCRIPTION

Figure 1:
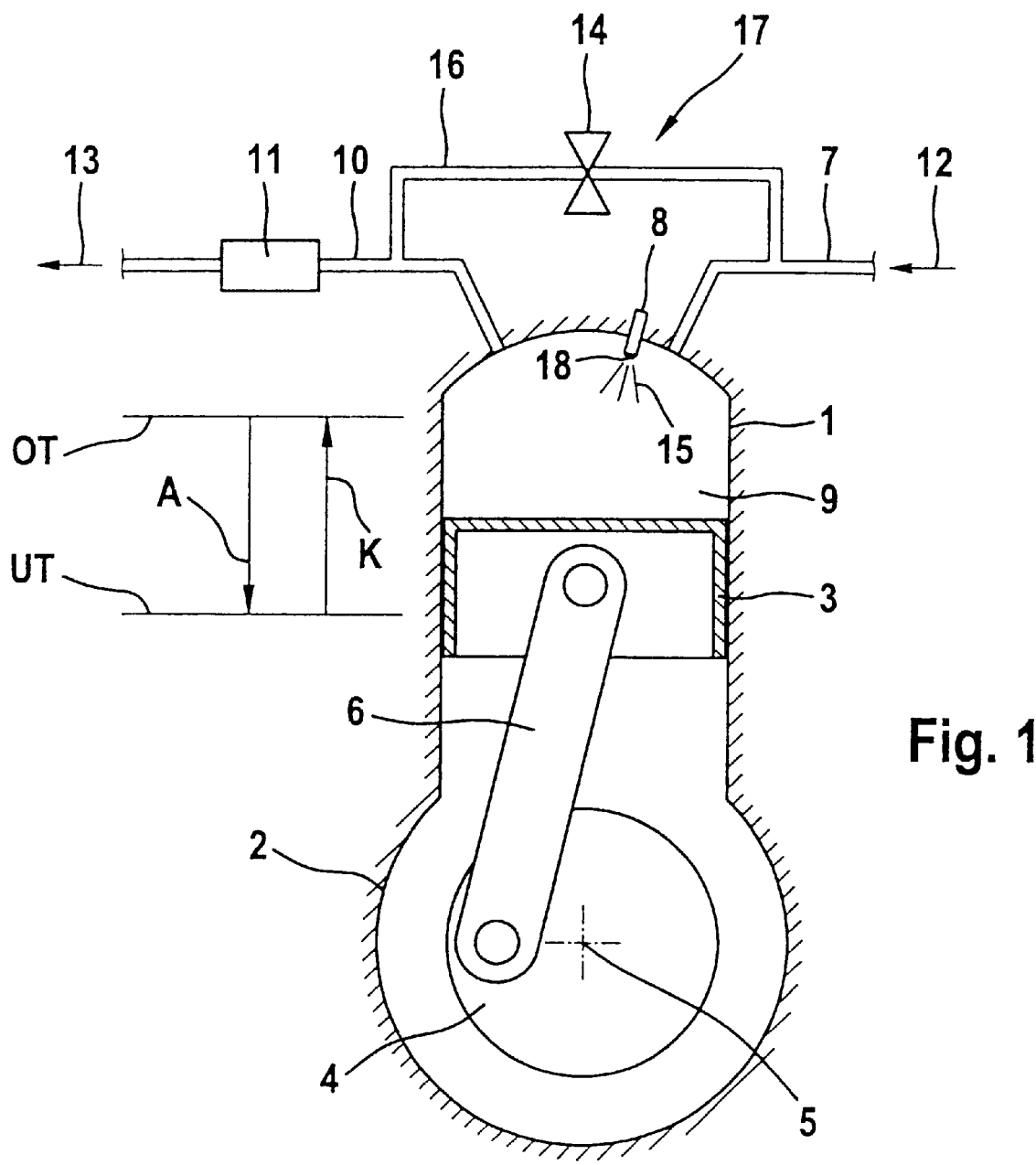
FIG. 1 is a schematic view of a diesel engine for use with the method according to the present invention.

FIG. 1 schematically illustrates a diesel engine having a cylinder 1 and a crankcase 2. A longitudinally displaceable piston 3 is held in the cylinder 1 and is connected via a connecting rod 6 in an articulated manner to a crankshaft 4 mounted in the crankcase 2. The crankshaft 4 may be rotated about a crank axle 5. The longitudinal moveability of the piston 3 is delimited by an upper dead center position OT and a lower dead center position UT. In an upward movement from the lower dead center position UT to the upper dead center position OT, the piston 3 performs a compression cycle, which is indicated by the arrow K, and in the reverse direction performs a working cycle, which is indicated by the arrow A. During a suction cycle S (FIG. 3) upstream of the compression cycle, combustion air 12 is guided into the cylinder 1 through a fresh air line 7 and in the subsequent compression cycle K is compressed. Fuel 15 is injected into the cylinder 1 through an injector valve 18 of an injector 8. The exhaust gas 13 arising during the combustion is removed through an exhaust-gas pipe 10 and a catalytic converter 11 arranged in the exhaust-gas pipe 10. An exhaust-gas recirculation system 17 for recirculating a partial quantity of the exhaust gas 13 to the combustion air 12 is provided, the exhaust-gas pipe 10 and the fresh air line 7 being connected to each other via an exhaust-gas recirculation line 16. An exhaust-gas recirculation valve 14 for setting the quantity of exhaust gas 13 to be recirculated is arranged in the exhaust-gas recirculation line 16.

Figure 2:
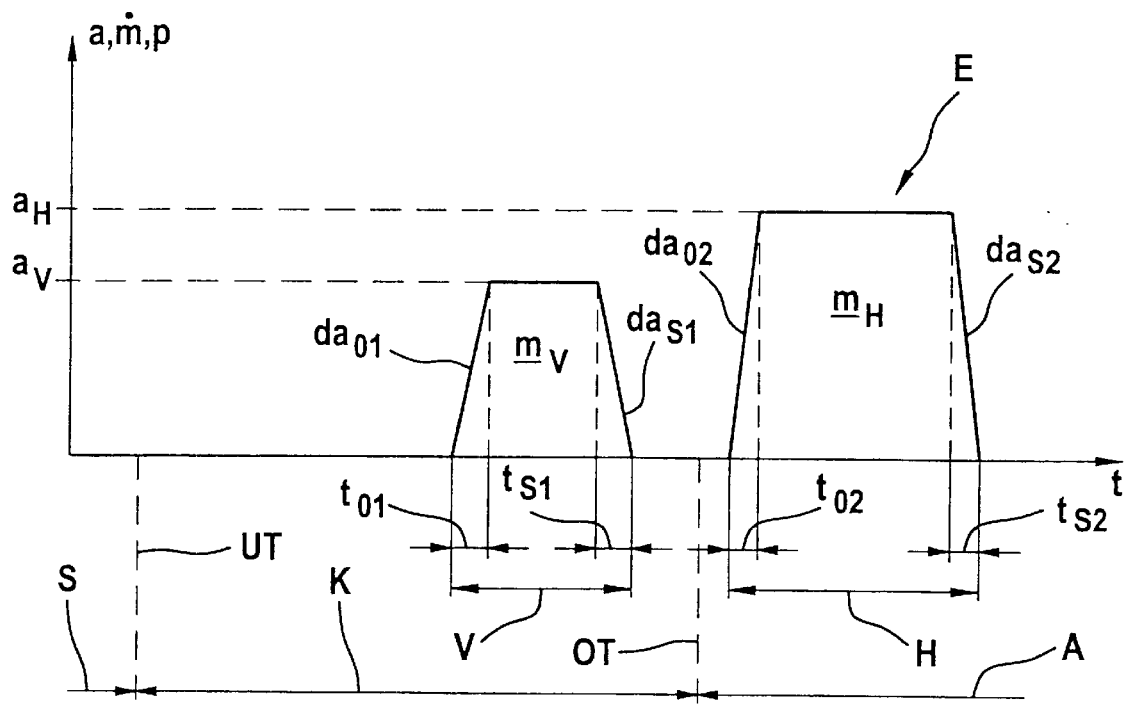
FIG. 2 is a schematic time diagram illustrating a pre-injection and main injection sequence.

FIG. 2 illustrates schematically the injection profile over the time t. During the compression cycle K delimited by the lower dead center position and the upper dead center position, a pre-injection V occurs, in which the injector valve 18 of the injector 8 (FIG. 1) is opened by the injector-valve stroke $a_V$. The opening of the injector valve 18 occurs at the beginning of the pre-injection V over a period $t_{01}$. A first opening gradient $da_{01}$ is produced from the quotient of the injector-valve stroke $a_v$ and the opening time $t_{01}$. In a manner comparable therewith, the injector valve 18 is closed at the end of the pre-injection V over a period $t_{s1}$, a corresponding, first closing gradient $da_{S1}$ being produced from the quotient of the injector-valve stroke $a_v$ and the closing period $t_{S1}$. The profile of the injector-valve stroke a results in a comparable profile of the mass flow ṁ of fuel 15 and of the corresponding fuel pressure p. The fuel quantity $m_V$ injected during the pre-injection V corresponds to the surface area of the curve illustrated.

A working cycle A follows the upper dead center position OT. After the upper dead center position OT an injection E of a fuel quantity m begins, which injection may also be performed without the pre-injection V and, in the example embodiment illustrated, is a main injection H following the pre-injection V. The injector-valve stroke $a_H$ during the main injection H, and with it the fuel pressure p and the mass flow ṁ of the fuel 15, is greater than during the pre-injection V. The main injection H occurs with a higher and therefore effective fuel pressure p at the injector-valve outlet opening than the pre-injection V. The injector valve 18 is opened abruptly during an opening period $t_{02}$, in which case a second opening gradient $da_{02}$ is produced from the quotient of the injector-valve stroke $a_H$ and the opening period $t_{02}$. The second opening gradient $da_{02}$ of the main injection H is greater than the first opening gradient $da_{01}$ of the pre-injection V, which results in an abrupt closing. Toward the end of the main injection H, the injector valve 18 is closed over a closing period $t_{S2}$, in which case a second closing gradient $da_{S2}$ is produced from the quotient of the injector-valve stroke $a_H$ and the second closing period $t_{S2}$. The second closing gradient $da_{S2}$ is greater than the first closing gradient $da_{S1}$ of the pre-injection V. The fuel quantity $m_H$ injected during the main injection H corresponds to the area below the curve shown in the region of the main injection H.

Figure 3:
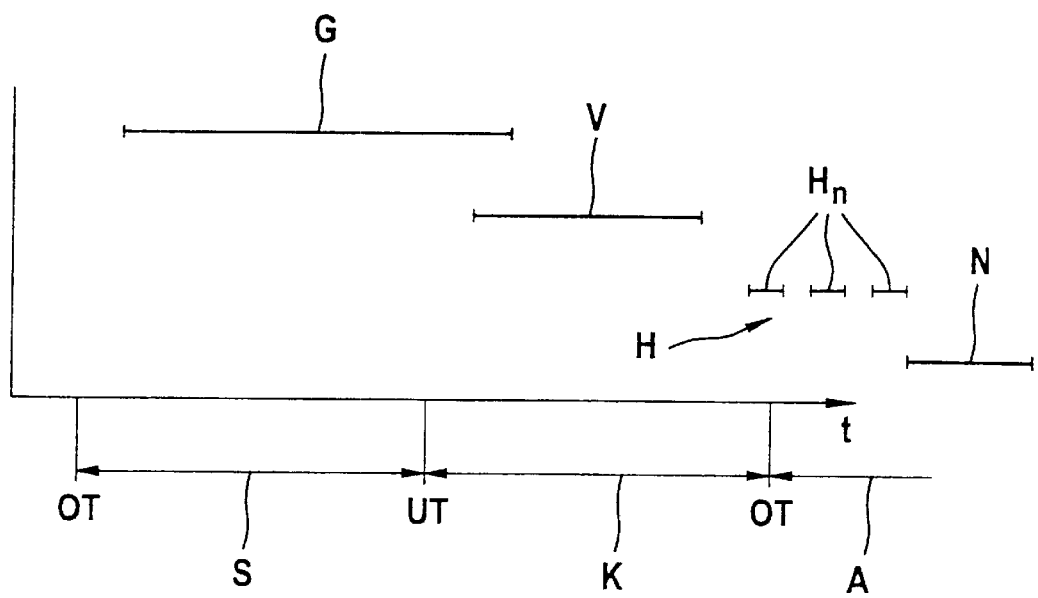
FIG. 3 is a schematic time diagram illustrating an additional homogenizing injection and after-injection and a division of the main injection into sub-injections.

FIG. 3 schematically illustrates a variant of the method illustrated in FIG. 2, in which an homogenizing injection G occurs before the pre-injection V. In the example embodiment illustrated, the homogenizing injection G and the pre-injection V may be in terms of time within the regions indicated by bars. They may occur immediately after one another. The homogenizing injection G occurs substantially during the suction cycle S which precedes the compression cycle K. The pre-injection V is followed by a main injection H which is divided into individual sub-injections $H_n$. Following the main injection H, an after-injection N is performed during the working cycle A. The individual injections may be spaced apart in terms of time with respect to one another or may be performed directly following one another.

What is claimed is:

1. A method for operating a diesel engine having a cylinder, a piston guided in a longitudinally displaceable manner oscillating between an upper dead center position and a lower dead center position in the cylinder, and an injector including an injector valve configured to inject a fuel quantity into the cylinder, the method comprising the steps of:

compressing combustion air in a compression cycle delimited by movement of the piston from the lower dead center position to the upper dead center position;

injecting a first portion of the fuel quantity during the compression cycle by opening the injector valve according to a first opening gradient;

injecting a remaining portion of the fuel quantity in a working cycle delimited by movement of the piston from the upper dead center position to the lower dead center position, the injecting step in the working cycle beginning after the upper dead center position;

abruptly opening the injector valve during the injecting step in the working cycle by opening the injector valve according to a second opening gradient that is greater than the first opening gradient.

2. The method according to claim 1, further comprising the step of abruptly closing the injector valve at an end of the injecting step.

3. The method according to claim 1, further comprising the step of feeding part of an arising exhaust gas in an exhaust-gas recirculation system to the combustion air.

4. A method for operating a diesel engine having a cylinder, a piston guided in a longitudinally displaceable manner oscillating between an upper dead center position and a lower dead center position in the cylinder, and an injector including an injector valve configured to inject a fuel quantity into the cylinder, the method comprising the steps of:

compressing combustion air in a compression cycle delimited by movement of the piston from the lower dead center position to the upper dead center position;

injecting the fuel quantity in a working cycle delimited by movement of the piston from the upper dead center position to the lower dead center position, the injecting step beginning after the upper dead center position;

abruptly opening the injector valve during the injecting step;

injecting a pre-injection quantity of fuel during the compression cycle;

opening the injector valve at a beginning of the pre-injection with a first opening gradient;

closing the injector valve at an end of the pre-injection with a first closing gradient;

injecting a main injection quantity of fuel, the injector valve being abruptly opened in the abruptly opening step at a beginning of the main injection with a second opening gradient; and closing the injector valve at an end of the main injection with a second closing gradient;

wherein the second opening gradient is greater than the first opening gradient.

5. The method according to claim 4, wherein the second closing gradient is greater than the first closing gradient.

6. The method according to claim 4, wherein the injector valve is opened in main injection with a greater valve stroke than in the pre-injection.

7. The method according to claim 4, wherein the main injection is performed with a higher and effective pressure at the opening of the injector valve than the pre-injection.

8. The method according to claim 4, wherein the main injection includes a plurality of sub-injections.

9. The method according to claim 4, further comprising the step of injecting an afterinjection after the main injection.

10. The method according to claim 4, further comprising the step of injecting a homogenizing injection before the main injection.

* * * * *